United States Patent [19]

Roy

[11] Patent Number: 5,632,110
[45] Date of Patent: May 27, 1997

[54] DEER DECOY

[76] Inventor: Roch Roy, 41, rue Notre-Dame, Cap-Chat, Quebec, Canada, G0J 1E0

[21] Appl. No.: 669,095

[22] Filed: Jun. 26, 1996

[51] Int. Cl.$^6$ .................................................. A01M 31/06
[52] U.S. Cl. ................................................................ 43/2
[58] Field of Search ...................... 43/1, 2, 3; 40/411, 40/415, 421, 485, 481; D22/113; 273/317, 355, 369, 406, 407

[56] References Cited

U.S. PATENT DOCUMENTS

| | | | |
|---|---|---|---|
| 1,836,203 | 12/1931 | Thompson | 40/411 |
| 2,793,456 | 5/1957 | Argo | 43/3 |
| 4,773,178 | 9/1988 | Marek | 43/1 |
| 4,852,288 | 8/1989 | Payne et al. | 43/2 |
| 4,911,453 | 3/1990 | Essex et al. | 273/406 |
| 4,965,953 | 10/1990 | McKinney | 43/2 |
| 5,029,408 | 7/1991 | Smith | 43/1 |
| 5,335,438 | 8/1994 | Terrill | 43/1 |

FOREIGN PATENT DOCUMENTS

| | | | |
|---|---|---|---|
| 262806 | 2/1929 | Italy | 43/2 |
| 129808 | 10/1950 | Sweden | 43/2 |

OTHER PUBLICATIONS

"La belle et les bêtes", by Pascale Millot, L'Actualité, Apr. 1st, 1996, pp. 58 to 62.

Primary Examiner—Jeanne Elpel
Attorney, Agent, or Firm—ROBIC

[57] ABSTRACT

A deer decoy particularly adapted for luring a deer confrontagion ritual. This decoy has an inclined support mounted on a tree trunk or picket and a deer head artifact pivotably mounted on the support. A cord is used for pulling one side of the deer head artifact so that the deer head pivots about the inclined support in a first direction. A spring is attached to the deer head and to a rod fixed to the trunk so that, after pulling on the cord, the deer head pivots in a second direction opposite to the first direction.

12 Claims, 4 Drawing Sheets

1

DEER DECOY

FIELD OF THE INVENTION

The present invention relates to a deer decoy, and more particularly to a decoy that can be activated by a user.

By deer, it is meant any member of the Cervidae family including deers, mooses, reindeers or the like. However, the decoy according to the invention could be adapted for use with other animals, such as antilope, mouflon or any other kind of animals.

BACKGROUND OF THE INVENTION

In an article entitled "La belle et les bêtes" that was published in l'Actualité on Apr. 1st, 1996, p 58–62, there is shown how someone may places paper or polystyrene antlers above his or her head in order to mimick a moose confrontation ritual. It is also explained that such is particularly efficient to lure a moose.

SUMMARY OF THE INVENTION

The object of the present invention to provide a deer decoy that can be by hunters or animal lovers for luring a deer in a very efficient manner by mimicking the deer confrontation ritual.

The deer decoy according to the present invention comprises:

holding means extending upwardly in a substantially vertical position;

pivoting means mounted on the holding means, the pivoting means extending therefrom in an upwardly and forwardly inclined position with respect to the holding means;

a deer head artifact pivotally mounted on the pivoting means, the deer head having a front part, a rear part, a first side and a second side, whereby the front part of the deer head is substantially facing an horizon;

pulling means having a first end attached to the first side of the deer head, and a second end extending towards a user, said pulling means being oriented in such a manner that, when the user pulls on the pulling means the deer head artifact pivots about the pivoting means in a first direction; and resilient means responsive to the pulling means for forcing the deer head artifact to pivot in a second direction opposite to the first direction.

Preferably, the pivoting means may consist of a rod having a tubular portion and a thin portion, the tubular portion being bent with respect to the thin portion, the rod being mounted on the holding means and extending therefrom in an upwardly and forwardly inclined position with respect to it.

Preferably also, a deer chest artifact can be mounted on the holding means.

BRIEF DESCRIPTION OF THE DRAWINGS

The invention will be better understood upon ready the following non-restriction description of a prefered embodiment thereof made with reference to the appended drawing, in which.

DETAILED DESCRIPTION OF A PREFERRED EMBODIMENT OF THE INVENTION

Figure 1:
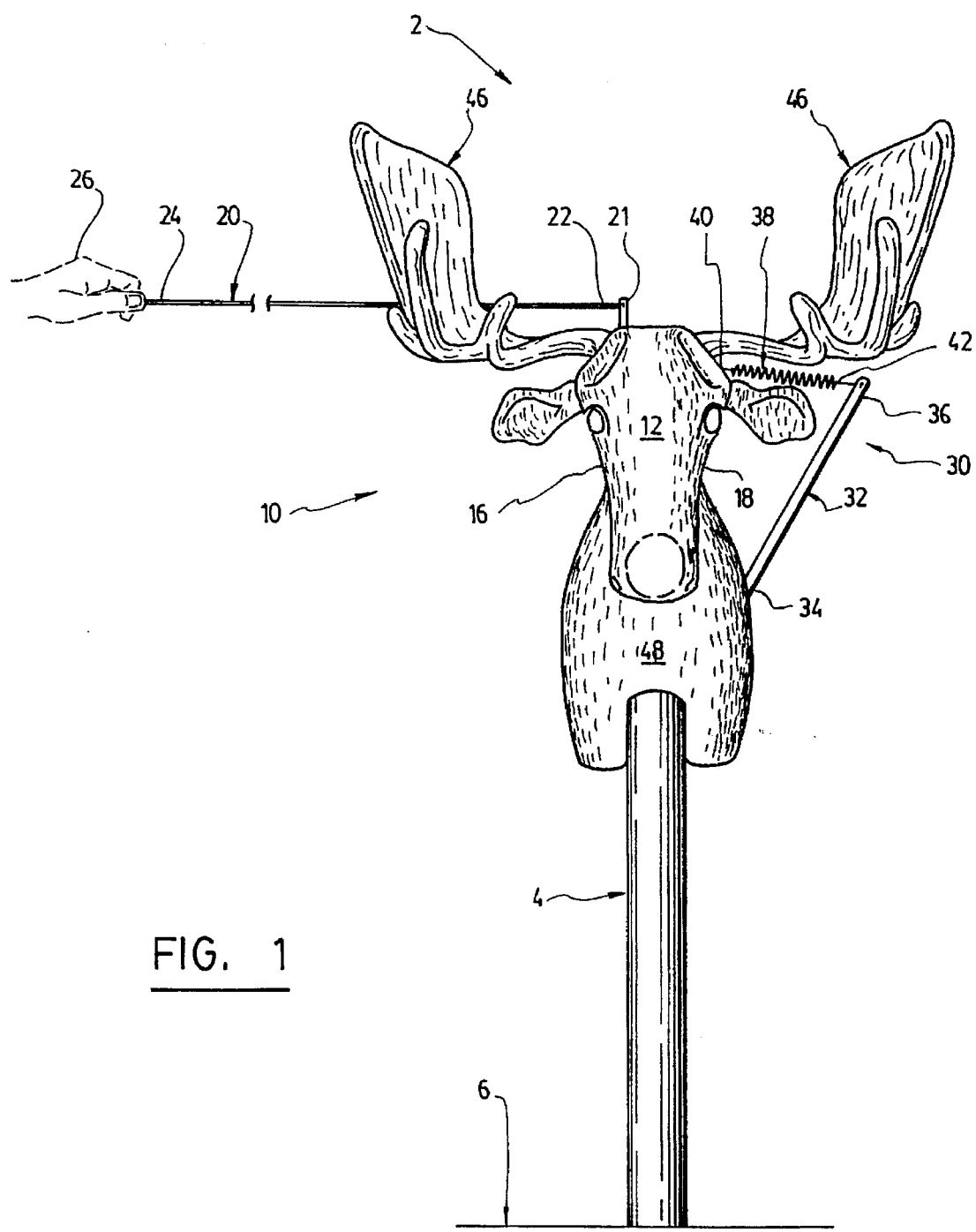
FIG. 1 is a front elevational view of a deer decoy according to a preferred embodiment of the invention.

FIGS. 1 to 4 show a deer decoy 2 according to the invention, which is mounted on a picket 4. Instead of a picket 4, use can be made of a tree trunk or of any upwardly extending structure. A rod 8 acting as pivoting means is mounted onto the upper part of the picket 4, so an to extend in an upwardly and forwardly inclined position. The rod 8 has a tubular portion 7 and a thin portion 9. The tubular portion 7 may have a one inch diameter. The rod 8 is held through its portion 9 on the picket 4 with bolts or nails 11. It can also be held in place with a collar 13.

A deer head artifact 10 is pivotally mounted on the rod 8. In the illustrated embodiment, the deer head artifact 10 is that of a moose. This deer head artifact 10 has a receiving cavity 15 at the base thereof which is sized to freely receive the tubular portion 7 of the rod 8. Since the tubular portion 7 is upwardly and forwardly inclined with respect to the picket 4, the deer head artifact can be balanced from one side to the other just like a real moose would do in a confrontation ritual with another moose.

The deer head artifact 10 has a front part 12 which faces the horizon. A pair of detachable antlers 46 having a breath of, for example, 38 inches, are mounted on the deer head artifact 10.

On a first side 16 of the deer head artifact, near the top thereof, a small hook 21 is mounted. Pulling means consisting of a cord 20 are provided. This cord 20 has a first end 22 that is attached to the hook 21, and a second end 24, that is intended to be held by a user 26, who can be a hunter or someone wishing to attract a moose.

On the second side 18 of the deer head artifact 10, resiliant means are provided, which are responsive to the pulling means for forcing the deer head artifact to pivot in a second direction opposite to the first direction. These means includes a spring 38 having a first end 40 attached to the deer head artifact 10, and a second end 42 attached to the free end 36 of a rod 32 preferably made of aluminum, which extends in an upwardly and forwardly inclined position with respect to the picket 4. The other end 34 of the aluminum rod 32 is inserted inside a hollow tube 35 which is attached to the picket 4.

Preferably, a deer chest artifact 48 made of a thin dark painted plywood board can be mounted on the picket 4, below the deer head 10, to complete the decoy.

Figure 2:
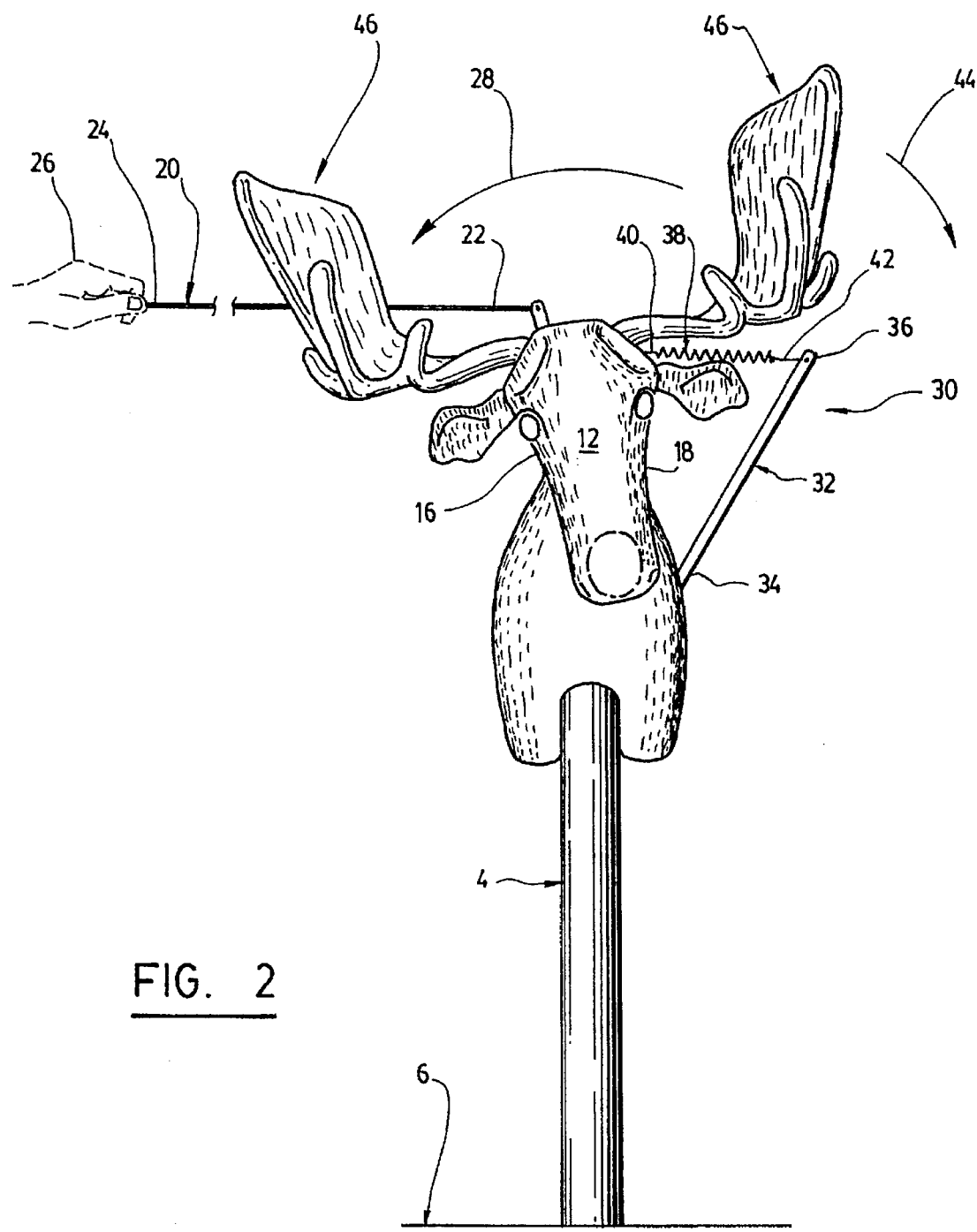
FIG. 2 is another front elevational view of the deer decoy of FIG. 1 wherein the deer head artifact is pivoted in a first direction.
Figure 3:
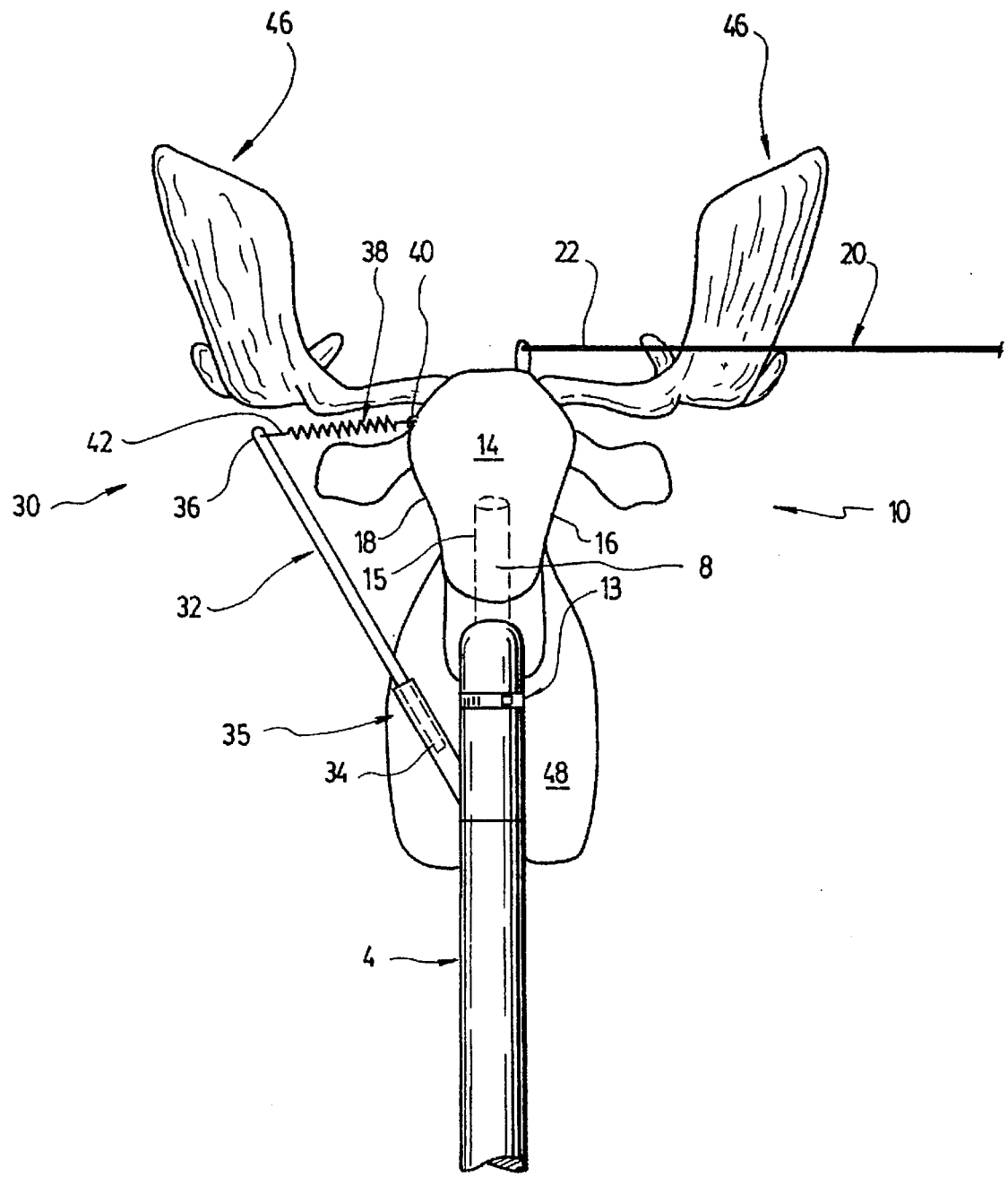
FIG. 3 is a rear elevational view of the deer decoy of FIG. 1 and 2.
Figure 4:
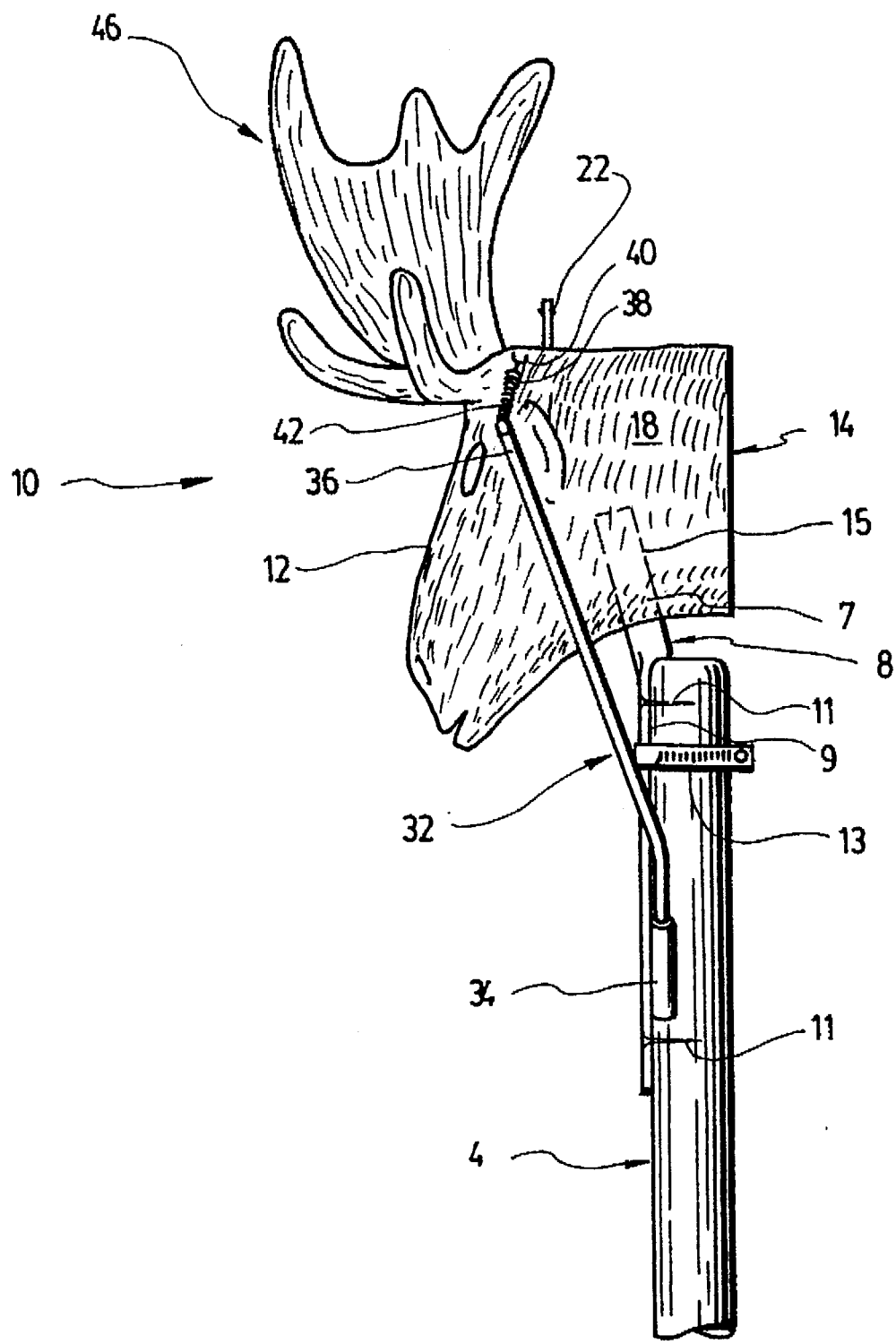
FIG. 4 is a side elevational view of the deer decoy shown in FIG. 1 to 3.

In operation, when the user pulls on the cord 20, the deer head artifact 10 pivots around the tube portion 7 in a first direction 28 (see FIG. 2). The spring 38 is then extended, creating an opposite force in an opposite direction 44. When the user stops pulling on the cord, the spring 38 forces the deer head to pivot in a second direction 44 opposite to the first direction 28. Therefore, the deer head artifact 10 is balanced from side to side just like in a moose confrontation ritual. The operation can be repeated several times until a "real" moose is attracted.

Of course, numerous modification could be made to the above described embodiment without departing from the scope of the present invention, as it is defined in the appended claims.

The embodiments of the invention in which an exclusive property or privilege is claimed are defined as follows:

1. A deer decoy, comprising:

holding means extending upwardly in a substantially vertical position;

pivoting means mounted on the holding means, the pivoting means extending therefrom in an upwardly and forwardly inclined position with respect to the holding means;

a deer head artifact pivotally mounted on the pivoting means, the deer head having a front part, a rear part, a first side, and a second side, whereby the front part of the deer head is substantially facing an horizon;

pulling means having a first end attached to the first side of the deer head, and a second end extending towards a user, said pulling means being oriented in such a manner that, when the user pulls on the pulling means, the deer head artifact pivots about the pivoting means in a first direction; and resilient means responsive to the pulling means for forcing the deer head artifact to pivot in a second direction opposite to the first direction.

2. The deer decoy according to claim 1, wherein the deer head has a pair of detachable antlers.

3. The deer decoy according to claim 2, wherein the pair of detachable antlers have a breath of about 38 inches.

4. The deer decoy according to claim 1, further comprising a deer chest artifact mounted on the holding means.

5. The deer decoy according to claim 4, wherein the deer chest is made of a thin dark painted board.

6. The deer decoy according to claim 1, wherein the holding means is a picket.

7. The deer decoy according to claim 1, wherein the pivoting means is a rod comprising a tubular portion and a thin portion, the tubular portion being bent with respect to the thin portion.

8. The deer decoy according to claim 7, wherein the tubular portion has a diameter of 1 inch.

9. The deer decoy according to claim 1, wherein the pulling means is a cord.

10. The deer decoy according to claim 9, wherein the resilient means comprises:

supporting means having a first end and a second end, the first end being attached to the holding means; and a spring means having a first end attached to the second side of the deer head artifact, and a second end attached to the second end of the supporting means;

whereby when the user releases the pulling means, the deer head artifact pivots in the second direction.

11. The deer decoy according to claim 9, wherein the resilient means comprises:

a hollow tube attached to the holding means in an upwardly inclined position with respect to the holding means;

a bar having a first end and a second end, the first end of said bar being inserted in the hollow tube whereby said bar has an upwardly and forwardly inclined position with respect to the holding means; and a spring means having a first end attached to the second side of the deer head artifact, and a second end attached to the second end of the bar;

whereby when the user releases the pulling means, the deer head artifact pivots in the second direction.

12. A deer decoy, comprising:

holding means extending upwardly in a substantially vertically position;

pivoting means comprising a rod having a tubular portion and a thin portion, the tubular portion being bent with respect to the thin portion, the rod being mounted on the holding means and extending therefrom in an upwardly and forwardly inclined position with respect to the holding means;

a deer head artifact pivotally mounted on the rod, the deer head having a front part, a rear part, a first side, and a second side, whereby the front part of the deer head is substantially facing an horizon;

a deer chest artifact mounted on the holding means;

a cord having a first end attached to the first side of the deer head, and a second end extending towards a user, said cord being oriented in such a manner that, when the user pulls on the cord, the deer head pivots about the rod in a first direction;

a hollow tube attached to the holding means, in an upwardly inclined position with respect to the holding means;

supporting means having a first end and a second end, said support means having its first end inserted into the hollow tube and thus extending in an upwardly and forwardly inclined position with respect to said holding means; and a spring having a first end attached to the second side of the deer head artifact, and a second end attached to the second end of the supporting means;

whereby, when the user releases the cord, the deer head artifact pivots in a second direction opposite to the first direction.

* * * * *